(12) United States Patent
Rehman

(10) Patent No.: US 6,187,086 B1
(45) Date of Patent: Feb. 13, 2001

(54) BLEED CONTROL SOLVENTS FOR PIGMENTED AND DYE-BASED INKS

(75) Inventor: Zia Rehman, Corvallis, OR (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/253,576

(22) Filed: Feb. 19, 1999

(51) Int. Cl.$^7$ .................................................. C09D 11/00
(52) U.S. Cl. .................................. 106/31.86; 106/31.28; 523/201
(58) Field of Search .................... 106/31.28, 31.86; 523/201

(56) References Cited

U.S. PATENT DOCUMENTS

| | | | |
|---|---|---|---|
| 5,160,372 | 11/1992 | Matrick | 106/19 R |
| 5,181,045 | 1/1993 | Shields et al. | 346/1.1 |
| 5,184,148 | 2/1993 | Suga et al. | 346/1.1 |
| 5,500,082 | 3/1996 | Chang et al. | 162/5 |
| 5,554,739 | 9/1996 | Belmont | 534/885 |
| 5,571,311 | 11/1996 | Belmont et al. | 106/20 R |
| 5,630,868 | 5/1997 | Belmont et al. | 106/31.75 |
| 5,656,071 | 8/1997 | Kappele et al. | 106/31.76 |
| 5,686,508 | 11/1997 | Shimomura et al. | 523/161 |
| 5,700,317 | 12/1997 | Adamic | 106/31.58 |
| 5,707,432 | 1/1998 | Adams et al. | 106/31.6 |
| 5,730,790 | 3/1998 | Rehman | 106/31.59 |
| 5,734,403 | 3/1998 | Suga et al. | 347/101 |
| 5,735,941 | * 4/1998 | Feeman et al. | 106/31.28 |
| 5,746,818 | 5/1998 | Yatake | 106/31.86 |
| 5,785,743 | 7/1998 | Adamic et al. | 106/31.27 |
| 5,814,685 | * 9/1998 | Satake et al. | 523/201 |
| 5,853,465 | * 12/1998 | Tsang et al. | 106/31.25 |

FOREIGN PATENT DOCUMENTS

| | | | |
|---|---|---|---|
| 0859037 | 8/1998 | (EP) | C09D/11/00 |
| 0872344 | 10/1998 | (EP) | B41J/2/01 |
| 2316412 | 2/1998 | (GB) | C09D/11/02 |

* cited by examiner

Primary Examiner—Mark L. Bell
Assistant Examiner—Veronica F. Faison

(57) ABSTRACT

Two classes of solvents, organic esters and diols and triols, help to reduce bleed between black (pigment-containing) inks and color (water-soluble dye-based) inks when used in formulating inks that contain self-dispersed pigments. The solvents help self-dispersed pigments to agglomerate by producing successful mutual collisions when the electrostatic potential is reduced with positively charged color inks. It appears that these solvents may be changing the dielectric constant of the ink, thereby reducing the repulsion potential of the pigment particles themselves.

30 Claims, No Drawings

BLEED CONTROL SOLVENTS FOR PIGMENTED AND DYE-BASED INKS

TECHNICAL FIELD

The present invention relates to generally to ink-jet inks, and, more particularly, to ink-jet inks with improved bleed control.

BACKGROUND ART

In ink development work with a new technology, one of the most important parameters to be considered is the bleed control between black and color inks, often referred to as "K/C control" or "K/C bleed". Using self-dispersed pigments as the colorant tends to result in relatively poor bleed control, compared to pigments that use a separate dispersant molecule. In these inks, the black ink contains the pigment, while the color inks contain one or more appropriate water-soluble dyes (cyan, yellow, magenta).

One might ask why it is so difficult to control bleed with self-dispersed pigments even though they have a negative charge and the color ink is low pH. The answer to this question is crucial in inventing a solvent system that can reduce bleed. Self-dispersed pigments, such as available from Cabot Corp., have negatively-charged groups that are covalently-bonded to the pigment surface. Theoretically, either a positive charge from cations, or a proton from a low pH color ink in the vicinity of two negatively-charged black, self-dispersed pigment particles should lower their electrostatic potential and allow the pigments to come closer and agglomerate. This apparently does not happen to the desired extent with the self-dispersed pigment and they don't crash with the same intensity on the paper. Without subscribing to any particular theory, it appears that their mutual collisions do not lead to agglomeration; in other words, their collisions are elastic in nature in that the two colliding particles bounce back away from each other. This is in contrast to a pigment-based ink using a separate dispersant, such as disclosed in U.S. Pat. No. 5,500,082, issued to H. Matrick et al. Such dispersant molecules with large "tentacles" (long chain carbons) sticking out and which have a more chance to "stick together" in the event of a collision.

Thus, there is a need to provide an ink containing a self-dispersing pigment that evidences improved bleed control.

DISCLOSURE OF INVENTION

In accordance with the present invention, two classes of solvents that help to reduce bleed are used in formulating inks that contain self-dispersed pigments. The two classes are organic esters and certain diols and triols.

The solvents disclosed herein help self-dispersed pigments to agglomerate by producing successful mutual collisions when the electrostatic potential is reduced with positively charged color inks. The details of this mechanism are not understood clearly yet. These solvents could be changing the dielectric constant of the ink, thereby reducing the repulsion potential of the pigment particles themselves.

BEST MODES FOR CARRYING OUT THE INVENTION

In accordance with the present invention, bleed control between black (K) inks containing self-dispersed pigments and color (CYM—cyan, yellow, magenta) inks containing water-soluble dyes is improved by incorporating either an organic ester or a diol in the black ink formulation.

1. Organic Esters

Non-surfactant organic esters having the formula R—COOR' may be suitably employed in the practice of the present invention, where R and R' are independently hydrogen, alkanes, alkenes, alkynes, alkoxies, carboxylates, and mixtures thereof, including both straight chain and branched chain structures and further including all stereoisomers. Examples of the ester group (—COOR') include citrate, succinate, lactate, formate, gluconate, tartrate, malonate, fumarate, malate, sebacate, laurate, glutarate, acetate, oxylate, adipicate, pimelicate, subericate, azelaicate and mixtures thereof The number of carbon atoms in the R and R' groups ranges from 1 to 5. The organic esters that are useful in the practice of the present invention are those that are solvents, not surfactants.

Examples of such non-surfactant organic esters include triethyl citrate, trimethyl citrate, and acetyl trimethyl citrate, and acetyl triethyl citrate; these esters are available under the tradenames Citroflex 2, Citroflex 1, Citroflex A1, Citroflex A2, respectively, all from Morflex Inc.

The concentration of the organic esters employed in the practice of the present invention is within the range of about 0.5 to 7 wt %, preferably about 2 to 4 wt %, and most preferably about 3 wt%, of the ink composition.

2. Diols and Triols

Several diols and triols were tested and showed substantial improvement in black/color bleed. These diols are 2-methyl-2,4-pentanediol (hexylene glycol), 1,2-octanediol, 2-methyl-1,3-propanediol, 3-methyl-1,5-pentanediol, 2,5-dimethyl-2,5-hexanediol, and 1,2-hexanediol. The triol is 3-methyl-1,3,5-pentanetriol.

The concentration range of the diols/triols, other than 1,2-octanediol, employed in the practice of the present invention is within the range of about 0.1 to 10 wt %, preferably about 1 to 7 wt %, and most preferably about 2 to 5 wt %, of the ink composition. The concentration range of 1,2-octanediol is within the range of about 0.25 to 1 wt %, preferably about 0.5 wt %, of the ink composition.

Not all diols are useful in reducing bleed between black and color inks. Examples of such diols include 3-hexyne-2,5-diol, and 2,5-dimethyl-3-hexyne-2,5-diol.

3. Ink Compositions—Black Inks

The black inks of the invention comprise a pigment and a vehicle. Specifically, the black inks of the present invention comprise about 5 to 50 wt %, preferably about 10 to 25 wt %, water-miscible organic co-solvent, about 0.05 to 10 wt %, preferably about 0.5 to 10 wt %, pigment, about 0.005 to 50 wt %, preferably about 0.1 to 10 wt %, more preferably about 0.5 to 5 wt %, durable latex polymer, about 0.005 to 50 wt %, preferably about 0.1 to 10 wt %, more preferably about 0.5 to 5 wt %, primer latex polymer, and water, in addition to the ester or diol/triol additive discussed above. Other components and additives to the ink may also be present, as discussed below.

3A. Self-Dispersed Pigments

In one embodiment, the colorant employed in the ink is a self-dispersing pigment. Such pigments suitable for use in the practice of the present invention include all chemically-modified, water-dispersible pigments known for use in ink-jet printing. These chemical modifications impart water-dispersibility to the pigment precursors that encompass all organic pigments.

For self-dispersibility or water solubility, the pigments herein are modified by the addition of one or more organic groups comprising at least one aromatic group or a $C_1$–$C_{12}$ alkyl group and at least one ionic or ionizable group. The ionizable group is one that forms its ionic groups in the aqueous medium. The ionic group may be anionic or cationic. The aromatic groups may be further substituted or unsubstituted. Examples include phenyl or naphthyl groups and the ionic group is sulfonic acid, sulfinic acid, phosphonic acid, carboxylic acid, ammonium, quaternary ammonium, or phosphonium group.

Depending on the process selected, the pigment can either be anionic or cationic in character. As commercially available, the anionic chromophores are usually associated with sodium or potassium cations, and the cationic chromophores are usually associated with chloride or sulfate anions.

For modification, one preferred method is treatment of a carbon black pigment with aryl diazonium salts containing at least one acidic functional group. Examples of aryl diazonium salts include those prepared from sulfinic acid, 4-aminobenzoic acid, 4-aminosalicylic acid, 7-amino-4-hydroxy-2-naphthylenesulfonic acid, aminophenyl-boronic acid, aminophenylphosphonic acid, and metalinic acid.

Ammonium, quaternary ammonium groups, quaternary phosphonium groups, and protonated amine groups represent examples of cationic groups that can be attached to the same organic groups discussed above.

Reference is made to U.S. Pat. Nos. 5,707,432; 5,630,868; 5,571,311; and 5,554,739 for a discussion of modified carbon black pigments and methods of attaching the functionalized groups.

The following water-insoluble pigments are useful in the practice of the invention; however, this listing is not intended to limit the invention. The following pigments are available from Cabot: Monarch® 1400, Monarch® 1300, Monarch® 1100, Monarch® 1000, Monarch® 900, Monarch® 880, Monarch® 800, and Monarch® 700. The following pigments are available from Ciba-Geigy: Igralite® Rubine 4BL. The following pigments are available from Columbian: Raven 7000, Raven 5750, Raven 5250, Raven 5000, and Raven 3500. The following pigments are available from Degussa: Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4, Printex U, Printex V, Printex 140U, and Printex 140V. The following pigment is available from DuPont: Tipure® R-101. The following pigment is available from Hoechst: Permanent Rubine F6B. The following pigment is available from Sun Chemical: LHD9303 Black.

Self-dispersing pigments are also commercially available from Cabot as Cab-O-Jet® 200 and Cab-O-Jet® 300.

In another embodiment herein, the black pigment is dispersed in the ink composition with the aid of a dispersing agent. Such black pigments include any black pigment that is dispersed with a dispersant having an anionic functionality, for example, the Joncryl polymers available from S. C. Johnson Polymer. Of course, any other dispersant exhibiting anionic charges may be employed in the practice of the present invention. For a more complete discussion of black pigments and anionic dispersants, see U.S. Pat. Nos. 5,181,045 and 5,785,743.

3B. Latex Polymers

Ink-jet inks have recently been developed that utilize latex polymers to achieve smearfastness. Examples of such latex polymers are disclosed in, for example, application Ser. No. 09/120,270 and application Ser. No. 09/120,046, both filed Jul. 21, 1998.

There are two types of such latex polymers employed in the practice of the present invention. The first type is referred to as "durable core/shell" polymers and are given by the formula $$[(A)_m(B)_n(C)_p(D)_q(E)_r]_x \quad (I)$$

wherein A, B, C, D, and E represent functionalities as follows:

A=at least one hydrophobic component contributing to improved durable, film-forming properties selected from moieties which, when homo-polymerized to a solid state, have a glass transition temperature ($T_g$) in the range between −150° C. to +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=5 to 95 wt %;

n=5 to 95 wt %;

p=0 to 60 wt %;

q=0 to 50 wt %;

r=0 to 40 wt %;

m+n+p+q+r=100 wt %; and x=1 to 100,000.

Preferably, the final $T_g$ of the polymer(s) (1) is within the range of about −25° to +110° C., and more preferably, the final $T_g$ is within the range of about −15° to +90° C., and most preferably within the range of about −10° to +75° C.

The molecular weight (weight average) of polymer (I) is between about 1,000 and 2,000,000, preferably between about 5,000 and 500,000, and most preferably between about 10,000 and 70,000.

Either the C moiety or the E moiety must be present in the polymer to provide a polymer having either a hydrophilic portion or a highly polar portion. Alternatively, one or more surfactants may be used in conjunction with polymer (I), whether in the presence or the absence of the C or E, or both, moieties. The surfactant(s) may be anionic, cationic, nonionic, or zwitterionic.

The second type of latex polymers is referred to as "primer core/shell" polymers, which also have a hydrophilic portion and a hydrophobic portion and have the following general structure given by formula (II)

$$[(A)_m(B)_n(C)_p(E)_r]_y \quad (II)$$

wherein A, B, C, and E are as described above and where m, n, and r are as follows:

m=0 to 90 wt %, preferably 10 to 60 wt %, and more preferably 15 to 50 wt %;

n=0 to 90 wt %, preferably 10 to 60 wt %, and more preferably 15 to 50 wt %;

p=0 to 90 wt %, preferably 10 to 60 wt %, and more preferably 15 to 50 wt %;

r=0.01 to 100 wt %, preferably 0.01 to 60 wt %, and more preferably 1 to 40 wt %;

m+n+r=100 wt %; and y=1 to 100,000, preferably 10 to 10,000, and more preferably 100 to 1,000.

Preferably, either m or n is non-zero.

The $T_g$ of the primer core/shell polymers is within the range of about −100° to +100° C., preferably within the range of about −25° to +25° C., and more preferably within the range of about 0° to +25° C.

The molecular weight (weight average) of polymer (II) is between about 100 and 2,000,000, preferably between about 1,000 and 500,000, and most preferably between about 5,000 and 300,000.

The durable and primer core/shell polymers are used with pigment colorants to disperse them in aqueous-based inks.

3C. Vehicle

The vehicle comprises one or more co-solvents and water. The co-solvents comprise one or more organic, water-miscible solvents commonly employed in ink-jet printing. Classes of co-solvents employed in the practice of this invention include, but are not limited to, aliphatic alcohols, aromatic alcohols, diols, glycol ethers, poly(glycol) ethers, caprolactams, formamides, acetamides, and long chain alcohols. Examples of compounds employed in the practice of this invention include, but are not limited to, primary aliphatic alcohols of 30 carbons or less, primary aromatic alcohols of 30 carbons or less, secondary aliphatic alcohols of 30 carbons or less, secondary aromatic alcohols of 30 carbons or less, 1,2-alcohols of 30 carbons or less, 1,3-alcohols of 30 carbons or less, 1,ω-alcohols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, N-alkyl caprolactams, unsubstituted caprolactams, substituted form amides, unsubstituted formamides, substituted acetamides, and unsubstituted acetamides. Specific examples of co-solvents that are preferably employed in the practice of this invention include, but are not limited to, N-methyl pyrrolidone, 1,5-pentanediol, 2-pyrrolidone, diethylene glycol, 1,3,5-(2-methyl)-pentanetriol, tetramethylene sulfone, 3-methoxy-3-methylbutanol, glycerol, and 1,2-alkyldiols.

The balance of the ink is water, together with other additives commonly added to ink-jet inks, which are employed to optimize the properties of the ink for specific applications. For example, as is well-known to those skilled in the art, biocides may be used in the ink composition to inhibit growth of microorganisms, sequestering agents such as EDTA may be included to eliminate deleterious effects of heavy metal impurities, and buffer solutions may be used to control the pH of the ink. Other known additives such as viscosity modifiers and other acrylic or non-acrylic polymers may be added to improve various properties of the ink compositions as desired. The purity of all components is that normally employ ed in conventional commercial practice of formulating ink-jet inks.

The pH of the pigment-based dye may be adjusted to as lightly basic value, say about 8.5, with potassium hydroxide, sodium hydroxide, sodium carbonate, or triethanol amine.

4. Ink Compositions—Color Inks

The color inks of the invention comprise at least one water-miscible dye and a vehicle. Specifically, the color inks of the present invention comprise anionic dyes, such as direct, acid, and basic dyes. Examples of anionic dyes include, but are not limited to Food Black 2, Direct Black 19, Acid Blue 9, Direct Blue 199, Direct Red 227, and Acid Yellow 23. Examples of cationic dyes include, but are not limited to, Basic Blue 3, Basic Violet 7, Basic Yellow 13, and Basic Yellow 51. The concentration of such a dye preferably ranges from about 0.1 to 7 wt %. Less than about 0.1 wt % results in an ink of unacceptable lightness, while greater than about 7 wt % results in clogging of the orifices in the ink-jet pen. More preferably, the dye is present within the range of about 0.1 to 4 wt % of the ink-jet ink composition. A mixture of dyes may also be employed.

The vehicle and additive(s) for an ink-jet ink containing at least one water-miscible dye are the same as for the pigment-based ink.

EXAMPLES

Example 1

Organic Ester

A black ink was formulated with the following components:

6 wt % 2-pyrollidone
7 wt % 3-hexyne-2,5-diol
3.5 wt % triethyl citrate
3.8 wt % LEG-1 (liponic ethylene glycol, available from Liponics)
3 wt % durable latex polymer QX25A, comprising (hexyl acrylate)$_{40}$ (methyl methacrylate)$_{40}$ (methyl polyethylene glycol (mw = 2000) methacrylate)$_{20}$
1 wt % primer latex polymer QX26B, comprising (methyl methacrylate)$_{32}$ (hexyl acrylate)$_{46}$ (methyl polyethylene glycol (mw = 350) methacrylate)$_{12}$ (acrylic acid)$_{10}$
3 wt % pigment (Monarch 700 treated with p-aminobenzoic acid (PABA) and amino dodecanoic acid (ADDA)
balance water.

The pH of the ink was adjusted to 8.5 with potassium hydroxide.

The color inks (cyan, yellow, and magenta) contained water-soluble dyes, and comprised proprietary, development compositions.

Comparative Example 1

The CYMK inks of Example 1 were formulated, except that the triethyl citrate was omitted from the black ink.

Results Between Example 1 and Comparative Example 1

Both CYMK sets of inks were printed on Gilbert Bond and Champion Data Copy papers. A set of printing patterns, developed by Hewlett-Packard for testing bleed control, was used. In testing bleed control, black and color inks are printed in various combinations of adjacent patterns.

The ink of Example 1 was observed to evidence better black-to-color bleed control than the ink of Comparative Example 1. Further, the ink of Example 1 had better long- and short-term decap than the ink of Comparative Example 1. The ink of Example 1 evidenced good start-up and printability.

Example 2

Diol

A black ink was formulated with the following components:

6 wt % 2-pyrollidone
7 wt % 3-hexyne-2,5-diol
3 wt % 2-methyl-2,4-pentanediol
3.8 wt % LEG-1
3 wt % durable latex polymer QX25A (same as Example 1)
1 wt % primer latex polymer QX26B (same as Example 1)
3 wt % pigment (same as Example 1)
balance water.

The pH of the ink was adjusted to 8.5 with potassium hydroxide.

The color inks (cyan, yellow, and magenta) contained water-soluble dyes, and comprised proprietary, development compositions.

Comparative Example 2

The CYMK inks of Example 2 were formulated, except that the 2-methyl-2,4-pentanediol was omitted from the black ink.

Results Between Example 2 and Comparative Example 2

Both CYMK sets of inks were printed on Gilbert Bond and Champion Data Copy papers. A set of printing patterns, developed by Hewlett-Packard for testing bleed control, was used. In testing bleed control, black and color inks are printed in various combinations of adjacent patterns.

The ink of Example 2 was observed to evidence better black-to-color bleed control than the ink of Comparative Example 2. Further, the ink of Example 2 had better long- and short-term decap than the ink of Comparative Example 2. The ink of Example 2 evidenced good start-up and printability.

Example 3

Diol

A black ink was formulated with the following components:

| | |
|---|---|
| 6 wt % | 2-pyrollidone |
| 7 wt % | 3-hexyne-2,5-diol |
| 0.5 wt % | 1,2-octanediol |
| 3.8 wt % | LEG-1 |
| 3 wt % | durable latex polymer QX25A (same as Example 1) |
| 1 wt % | primer latex polymer QX26B (same as Example 1) |
| 3 wt % | pigment (same as Example 1) |
| balance | water. |

The pH of the ink was adjusted to 8.5 with potassium hydroxide.

The color inks (cyan, yellow, and magenta) contained water-soluble dyes, and comprised proprietary, development compositions.

Comparative Example 3

The CYMK inks of Example 3 were formulated, except that the 1,2-octanediol was omitted from the black ink.

Results Between Example 3 and Comparative Example 3

Both CYMK sets of inks were printed on Gilbert Bond and Champion Data Copy papers. A set of printing patterns, developed by Hewlett-Packard for testing bleed control, was used. In testing bleed control, black and color inks are printed in various combinations of adjacent patterns.

The ink of Example 3 was observed to evidence better black-to-color bleed control than the ink of Comparative Example 3. Further, the ink of Example 3 had better long- and short-term decap than the ink of Comparative Example 3. The ink of Example 3, however, evidenced feathering if the 1,2-octanediol was used at higher concentration levels, greater than about 1 wt %.

INDUSTRIAL APPLICABILITY

The organic esters and diols/triols, as disclosed herein, is expected to find use in ink-jet inks for control of bleed between black and color inks.

Thus, there have been disclosed ink-jet ink compositions to which certain organic esters or diols/triols have been added for the control of bleed between black and color inks. It will be apparent to those skilled in this art that various changes and modifications of an obvious nature may be made, and all such changes and modifications are intended to fall within the scope of the appended claims.

What is claimed is:

1. An aqueous-based black ink-jet composition having a single liquid phase for ink-jet printing in combination with at least one water-soluble dye-based color ink, said black ink-jet composition containing a black self-dispersing pigment and a vehicle comprising at least one water-miscible organic co-solvent and water, said black ink-jet composition further containing at least one solvent in addition to said at least one water-miscible organic co-solvent and selected from the group consisting of organic esters, diols, and triols, present in an effective amount to reduce bleed between pigment-based, black inks and water-soluble dye-based color inks.

2. The ink-jet ink of claim 1 wherein said organic ester is R—COOR', where R and R' are independently hydrogen, alkanes, alkyls, alkenes, alkynes, alkoxies, carboxylates, and mixtures thereof, including both straight chain and branched chain structures and further including all stereoisomers and wherein R and R' each have from 1 to 5 carbon atoms.

3. The ink-jet ink of claim 2, wherein said —COOR' group is selected from the group consisting of citrate, succinate, lactate, formate, gluconate, tartrate, malonate, fumarate, malate, sebacate, laurate, glutarate, acetate, oxylate, adipicate, pimelicate, subericate, azelaicate and mixtures thereof.

4. The ink-jet ink of claim 3 wherein said organic ester comprises at least one ester selected from the group consisting of triethyl citrate, trimethyl citrate, acetyl trimethyl citrate, and acetyl triethyl citrate.

5. The ink-jet ink of claim 2 wherein said organic ester has a concentration in said ink-jet ink ranging from about 0.5 to 7 wt %.

6. The ink-jet ink of claim 5 wherein said concentration ranges from about 2 to 4 wt %.

7. The ink-jet ink of claim 1 wherein said diol comprises at least one diol selected from the group consisting of 2-methyl-2,4-pentanediol, 1,2-octanediol, 2-methyl-1,3-propanediol, 3-methyl-1,5-pentanediol, 2,5-dimethyl-2,5-hexanediol, 1,2-hexanediol, and wherein said triol consists essentially of 3-methyl-1,3,5-pentanetriol.

8. The ink-jet ink of claim 7 wherein said diol or said triol, other than 1,2-octanediol, each has a concentration in said ink-jet ink ranging from about 0.1 to 10 wt % and wherein said 1,2-octanediol has a concentration ranging from about 0.25 to 1 wt %.

9. The ink-jet ink of claim 8 wherein said concentration of said diol or said triol, other than 1,2-octane diol, ranges from about 1 to 7 wt % and wherein said 1,2-octanediol has a concentration of about 0.5 wt %.

10. The ink-jet ink of claim 1 further containing at least one latex polymer selected from the group consisting of:

(a) $[(A)_m(B)_n(C)_p(D)_q(E)_r]_x$     (I)

wherein A, B, C, D, and E represent functionalities as follows:

A=at least one hydrophobic component contributing to improved durable, film-forming properties selected from moieties which, when homo-polymerized to a solid state, have a glass transition temperature ($T_g$) in the range between −150° C. to +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=5 to 95 wt %;
n=5 to 95 wt %;
p=0 to 60 wt %;
q=0 to 50 wt %;
r=0 to 40 wt %;
m+n+p+q+r=100 wt %; and
x=1 to 100,000; and $$\text{(b) } [(A)_m(B)_n(C)_p(E)_r]_y \quad \text{(II)}$$

wherein A, B, C, and E are as described above and where m, n, p, and r of formula (II) are as follows:

m=0 to 90 wt %;
n=0 to 90 wt %;
p=0 to 90 wt %;
r=0.01 to 100 wt %;
m+n+p+r=100 wt %; and
y=1 to 100,000.

11. A method for reducing bleed between (a) an aqueous-based black ink having a single liquid phase and containing at least one self-dispersed black pigment and a vehicle comprising at least one water-miscible organic co-solvent and water, and (b) color inks containing water-soluble color dyes, said method comprising adding an effective amount of a solvent selected from the group consisting of organic esters, diols, and triols to said black ink containing said self-dispersed black pigment, said solvent added in addition to said at least one water-miscible organic co-solvent.

12. The method of claim 11 wherein said organic ester is R—COOR', where R and R' are independently hydrogen, alkanes, alkyls, alkenes, alkynes, alkoxies, carboxylates, and mixtures thereof, including both straight chain and branched chain structures and further including all stereoisomers, and wherein R and R' each have from 1 to 5 carbon atoms.

13. The method of claim 12 wherein said —COOR' group is selected from the group consisting of citrate, succinate, lactate, formate, gluconate, tartrate, malonate, fumarate, malate, sebacate, laurate, glutarate, acetate, oxylate, adipicate, pimelicate, subericate, azelaicate and mixtures thereof.

14. The method of claim 13 wherein said organic ester comprises at least one ester selected from the group consisting of triethyl citrate, trimethyl citrate, acetyl trimethyl citrate, and acetyl triethyl citrate.

15. The method of claim 11 wherein said organic ester has a concentration in said ink-jet ink ranging from about 0.5 to 7 wt %.

16. The method of claim 15 wherein said concentration ranges from about 2 to 4 wt %.

17. The method of claim 11 wherein said diol comprises at least one diol selected from the group consisting of 2-methyl-2,4-pentanediol, 1,2-octanediol, 2-methyl-1,3-propanediol, 3-methyl-1,5-pentanediol, 2,5-dimethyl-2,5-hexanediol, and 1,2-hexanediol, and wherein said triol consists essentially of 3-methyl-1,3,5-pentanetriol.

18. The method of claim 17 wherein said diol or said triol, other than 1,2-octanediol, each have a concentration in said ink-jet ink ranging from about 0.1 to 10 wt % and wherein said 1,2-octanediol has a concentration ranging from about 0.25 to 1 wt %.

19. The method of claim 18 wherein said concentration of said diol or said triol, other than 1,2-octane diol, ranges from about 1 to 7 wt % and wherein said 1,2-octanediol has a concentration of about 0.5 wt %.

20. The method of claim 11 further comprising adding to said ink containing said self-dispersed pigment at least one latex polymer selected from the group consisting of:

$$\text{(a) } [(A)_m(B)_n(C)_p(D)_q(E)_r]_x \quad \text{(I)}$$

wherein A, B, C, D, and E represent functionalities as follows:

A=at least one hydrophobic component contributing to improved durable, film-forming properties selected from moieties which, when homo-polymerized to a solid state, have a glass transition temperature ($T_g$) in the range between −150° C. to +25° C.;

B=at least one hydrophobic and solvent barrier moiety used to adjust the $T_g$ of the hydrophobic component of the polymer (I) which, when homo-polymerized to a solid state, has a $T_g$ greater than +25° C.;

C=at least one hydrophilic component, selected from a wide variety of water-soluble monomers (optional);

D=at least one UV absorber (optional);

E=a moiety having at least one highly polar functional group (optional);

m=5 to 95 wt %;
n=5 to 95 wt %;
p=0 to 60 wt %;
q=0 to 50 wt %;
r=0 to 40 wt %;
m+n+p+q+r=100 wt %; and
x=1 to 100,000; and $$\text{(b) } [(A)_m(B)_n(C)_p(E)_r]_y \quad \text{(II)}$$

wherein A, B, C, and E are as described above and where m, n, p, and r of formula (II) are as follows:

m=0 to 90 wt %;
n=0 to 90 wt %;
p=0 to 90 wt %;
r=0.01 to 100 wt %;
m+n+p+r=100 wt %; and
y=1 to 100,000.

21. An aqueous-based black ink-jet composition having a single liquid phase for ink-jet printing in combination with at least one water-soluble dye-based color ink, said black ink-jet ink composition containing a black self-dispersing pigment and a vehicle comprising at least one water-miscible organic co-solvent and water, said black ink-jet ink composition further containing at least one solvent in addition to said at least one water-miscible organic co-solvent and selected from the group consisting of organic esters, diols, and triols, present in an effective amount to reduce bleed between pigment-based, black inks and water-soluble dye-based color inks, wherein said organic ester is selected from the group consisting of triethyl citrate and acetyl triethyl citrate, wherein said diol is selected from the group consisting of 2-methyl-2,4-pentanediol, 1,2-octanediol, 2-methyl-1,3-propanediol, 3-methyl-1,5-panetanediol, 2,5-dimethyl-2,5-hexanediol, 1,2-hexanediol, and wherein said triol consists essentially of 3-methyl-1,3,5-pentanetriol, and wherein said diol or said triol, other than 1,2-octanediol, each has concentration in said ink-jet ink ranging from about 0.1 to 10 wt % and wherein said 1,2-octanediol has a concentration ranging from about 0.25 to 1 wt %.

22. The ink-jet ink of claim 21 wherein said organic ester has a concentration in said ink-jet ranging from about 0.5 to 7 wt %.

23. The ink-jet ink of claim 22 wherein said concentration ranges from about 2 to 4 wt %.

24. The ink-jet ink of claim 21 wherein said concentration of said diol or said triol, other than 1,2-octane diol, ranges from about 1 to 7 wt % and wherein said 1,2-octanediol has a concentration of about 0.5 wt %.

25. The ink-jet ink of claim 21 further containing at least one latex polymer selected from the group consisting of:

(a) $[(A)_m(B)_n(C)_p(D)_q(E)_r]_x$      (I)

wherein A, B, C, D, and E represent functionalities as follows:
- A=at least one hydrophobic component contributing to improved durable, film-forming properties selected from moieties which, when homo-polymerized to a solid state, have a glass transition temperature ($T_g$) in the range between −150° C. to +25° C.;
- B=at least one hydrophobic and solvent barrier moiety used to adjust the $T_g$ of the hydrophobic component of the polymer (I) which, when homo-polymerized to a solid state, has a $T_g$ greater than +25° C.;
- C=at least one hydrophilic component, selected from a wide variety of water-soluble monomers (optional);
- D=at least one UV absorber (optional);
- E=a moiety having at least one highly polar functional group (optional);
- m=5 to 95 wt %;
- n=5 to 95 wt %;
- p=0 to 60 wt %;
- q=0 to 50 wt %;
- r=0 to 40 wt %;
- m+n+p+q+r=100 wt %; and
- x=1 to 100,000; and (b) $[(A)_m(B)_n(C)_p(E)_r]_y$      (II)

wherein A, B, C, and E are as described above and where m, n, p, and r of formula (II) are as follows:
- m=0 to 90 wt %;
- n=0 to 90 wt %;
- p=0 to 90 wt %;
- r=0.01 to 100 wt %; and
- y=1 to 100,000.

26. A method for reducing bleed between (a) an aqueous-based black ink having a single liquid phase and containing at least one self-dispersed black pigment and a vehicle comprising at least one water-miscible organic co-solvent and water, and (b) color inks containing water-soluble color dyes, said method comprising adding an effective amount of a solvent selected from the group consisting of organic esters, diols, and triols to said black ink containing said self-dispersed black pigment, said solvent added in addition to said at least one water-miscible organic co-solvent, wherein said organic ester is selected from the group consisting of triethyl citrate and acetyl triethyl citrate, wherein said diol is selected from the group consisting of 2-methyl-2,4-pentanediol, 1,2-octanediol, 2-methyl-1,3-propanediol, 3-methyl-1,5-pentanediol, 2,5-dimethyl-2,5-hexanediol, 1,2-hexanediol, and wherein said triol consists essentially of 3-methyl-1,3,5-pentanetriol, and wherein said diol or said triol, other than 1,2-octanediol, each has a concentration in said ink-jet ink ranging from about 0.1 to 10 wt % and wherein said 1,2-octanediol has a concentration ranging from about 0.25 to 1 wt %.

27. The method of claim 26 wherein said organic ester has a concentration in said ink-jet ranging from about 0.5 to 7 wt %.

28. The method of claim 27 wherein said concentration ranges from about 2 to 4 wt %.

29. The method of claim 26 wherein said concentration of said diol or said triol, other and 1,2-octane diol, ranges from about 1 to 7 wt % and wherein said 1,2-octanediol has a concentration of about 0.5 wt %.

30. The method of claim 26 further comprising adding to said ink containing said self-dispersed pigment at least one latex polymer selected from group consisting of:

(a) $[(A)_m(B)_n(C)_p(D)_q(E)_r]_x$      (I)

wherein A, B, C, D, and E represent functionalities as follows:
- A=at least one hydrophobic component contributing to improved durable, film-forming properties selected from moieties which, when homo-polymerized to a solid state, have a glass transition temperature ($T_g$) in the range between −150° C. to +25° C.;
- B=at least one hydrophobic and solvent barrier moiety used to adjust the $T_g$ of the hydrophobic component of the polymer (I) which, when homo-polymerized to a solid state, has a $T_g$ greater than +25° C.;
- C=at least one hydrophilic component, selected from a wide variety of water-soluble monomers (optional);
- D=at least one UV absorber (optional);
- E=a moiety having at least one highly polar functional group (optional);
- m=5 to 95 wt %;
- n=5 to 95 wt %;
- p=0 to 60 wt %;
- q=0 to 50 wt %;
- r=0 to 40 wt %;
- m+n+p+q+r=100 wt %; and
- x=1 to 100,000; and (b) $[(A)_m(B)_n(C)_p(E)_r]_y$      (II)

wherein A, B, C, and E are as described above and where m, n, p, and r of formula (II) are as follows:
- m=0 to 90 wt %;
- n=0 to 90 wt %;
- p=0 to 90 wt %;
- r=0.01 to 100 wt %;
- m+n+p+r=100 wt %; and
- y=1 to 100,000.

\* \* \* \* \*